Feb. 16, 1971    A. TOPOUZIAN    3,563,031
GAS TURBINE ENGINE HEAT EXCHANGER AND COMBUSTION SYSTEM
Filed Jan. 13, 1969    2 Sheets-Sheet 1

INVENTOR
ARMENAG TOPOUZIAN
BY
*John R. Faulkner*
*Glenn S. Arendsen*
ATTORNEYS

United States Patent Office 3,563,031
Patented Feb. 16, 1971

3,563,031
GAS TURBINE ENGINE HEAT EXCHANGER AND COMBUSTION SYSTEM
Armenag Topouzian, Detroit, Mich., assignor to Ford Motor Company, Dearborn, Mich., a corporation of Delaware
Filed Jan. 13, 1969, Ser. No. 790,641
Int. Cl. F02c 7/10
U.S. Cl. 60—39.51                6 Claims

ABSTRACT OF THE DISCLOSURE

Fuel injected into the compressed air upstream of the heat exchanger vaporizes and mixes with the air during passage through the heat exchanger. The fuel-air mixture is ignited as it emerges from the heat exchanger and burns within a short distance from the exit surface of the heat exchanger. Fuel is injected through nozzles upstream of the compressor or a slinger system associated with the rotating compressor.

BACKGROUND OF THE INVENTION

In conventional regenerative type gas turbine engines designed for automotive use, air from the compressor passes through a heat exchanger to a combustion chamber. Fuel is injected into the air within the combustion chamber and the fuel-air mixture is ignited within the chamber after the mixture has traveled only a relatively short distance, usually about 4–6 inches. Hot combustion gases from the combustion chamber are applied to the turbine wheels and then pass through the heat exchanger where excess heat is transferred to the incoming air.

The combustion chambers of these gas turbine engines operate at extremely high temperatures that necessitate the use of expensive high temperature alloys or ceramics. Since fuel and air are being mixed for only a short time prior to ignition, the homogeneity necessary for efficient combustion is difficult to achieve. Additionally, gas turbine engines having high power capabilities generally required two or more combustion chambers, which increased considerably the size of the engine housing.

SUMMARY OF THE INVENTION

This invention provides a gas turbine engine in which the fuel is added to the compressed air upstream of the heat exchanger so the fuel mixes with the air prior to and during passage through the heat exchanger. Included in an engine of this invention is a compressor for producing a stream of compressed, relatively cool air and a turbine for using a stream of relatively warm gases to drive the compressor and produce output torque. A fuel supply adds fuel to the stream of relatively cool compressed air and a heat exchanger transfers heat from the relatively warm air leaving the turbine to the stream of air and fuel. Heat added to the fuel-air stream in the heat exchanger assists in vaporizing the fuel.

An igniter located in the vicinity of the downstream edge of the heat exchanger ignites the fuel-air mixture as the mixture leaves the heat exchanger. In some cases, a plurality of igniters might be desirable. The flame front is anchored on or removed slightly from the downstream surface of the heat exchanger. Hot gases from the combustion pass first through the turbine wheels and then through the heat exchanger.

Improved engine efficiency results from the homogeneous fuel-air mixture produced by the relatively long mixing time. Fuel vaporization in the heat exchanger increases heat transfer and reduces the operating temperature of the heat exchanger. A recuperator or a regenerator can be used as the heat exchanger. Fuel can be added to the air stream by conventional nozzles or by a slinger arrangement associated with the radial compressor. The slinger arrangement provides an even longer mixing period for the fuel and air.

DETAILED DESCRIPTION

Figure 1:
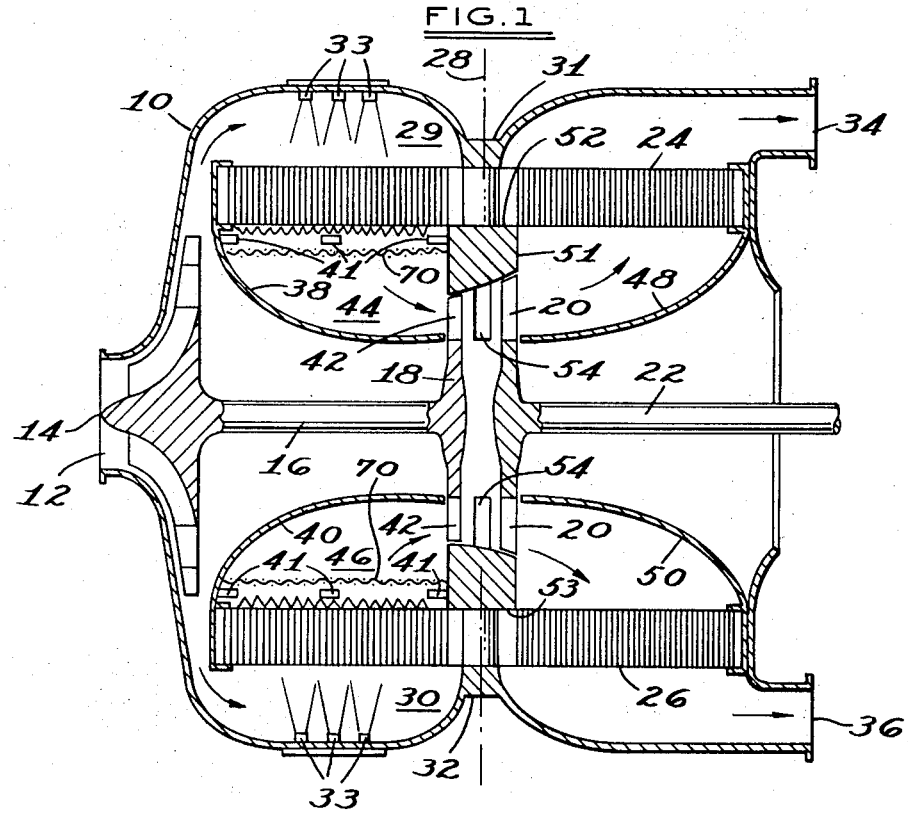
FIG. 1 is a sectional view through a gas turbine engine having fuel nozzles for injecting fuel into the compressed air stream shortly before the air stream enters a regenerator.

Referring to FIG. 1, the engine of this invention comprises a housing 10 having an air inlet 12 located in one side on the approximate center line. A radial compressor 14 is mounted just inside inlet 12 and is connected by a shaft 16 to a compressor turbine wheel 18. Shaft 16 is supported in housing 10 by appropriate bearings (not shown). A power turbine wheel 20 is mounted directly behind compressor turbine wheel 18 and is connected to an output shaft 22.

Mounted rotatably in housing 10 on each side of the turbine wheels are disc type regenerators 24 and 26. Discs 24 and 26 preferably are made of ceramic materials and comprise a plurality of small passages running parallel to the rotational axis 28 of the discs.

Housing 10 projects radially outward from the tips of the blades of compressor 14 and curves backward over the forward semicircular portions of discs 24 and 26. The housing then curves inward along a diameter of discs 24 and 26 perpendicular to axis 28 to form pads 31 and 32. These portions of housing 10 with the outer surfaces of the forward portions of discs 24 and 26 define chambers 29 and 30. A plurality of fuel injecting nozzles 33 are mounted in housing 10 axially outward of discs 24 and 26 and project into chambers 29 and 30. Nozzles 33 are connected to a pressurized fuel supply by appropriate conduits (not shown). Rearawrd of pads 31 and 32, the housing again curves outward to form exits 34 and 36.

Baffles 38 and 40 start at the fornt edges of the forward semicircular portions of discs 24 and 26 and project inwardly and rearwardly toward the blades 42 of compressor turbine wheel 18. A plurality of igniters 41 are mounted in baffles 38 and 40 just inside discs 24 and 26. Baffles 38 and 40 cooperate with the surface of discs 24 and 26 from which the fuel-air mixture exits to define respective combustion chambers 44 and 46. Similar baffles 48 and 50 project rearwardly from power turbine wheel 20 and curve upward toward the rear lower edge of the rear semicircular portions of discs 24 and 26.

Across discs 24 and 26 from respective pads 31 and 32, toroidally shaped member 51 has its inner periphery spaced radially outward of turbine wheels 18 and 20. Flat portions 52 and 53 are formed on the exterior periphery of member 51 across respective discs 24 and 26 from pads 31 and 32. Stator vanes 54 mounted on member 51 project inward between the blades of the compressor turbine wheel 18 and the blades of the power turbine wheel 20. The stator vanes serve as the turbine inlet nozzle and can be of the fixed or variable type. Sealing members (not shown) seal the surfaces between pads 31 and 32 and discs 24 and 26, the front edges of the discs and the baffles 38 and 40, the rear edges of the discs and baffles 48 and 50, and the discs and flats 52 and 53.

Air drawn into inlet 12 is compressed by compressor 14 and a diffuser (not shown) mounted radially outward of the compressor blade tips. As the compressed air flows into chambers 29 and 30, fuel is injected into the air via nozzles 33. The fuel vaporizes and mixes with the air in chambers 29 and 30 and as the components enter and pass through the forward semicircular portions of discs 24 and 26. Upon emerging from the inner surfaces of the forward semicircular portions, which surfaces are referred to as the exit surfaces, the fuel and air mixture is ignited by igniters 41. The mixture burns in chambers 44 and 46 and the hot combustion gases are conducted against the turbine blades where the gases produce the power necessary to operate compressor 14 and drive output shaft 22.

Gases exiting from turbine wheel 20 are ducted by baffles 48 and 50 through the rear semicircular portions of discs 24 and 26. The gases leaving the discs pass out exits 34 and 36. Discs 24 and 26 rotate and thereby transfer heat from the gases passing through the rear semicircular portions to the fuel-air mixture passing through the front semicircular portions.

Figure 2:
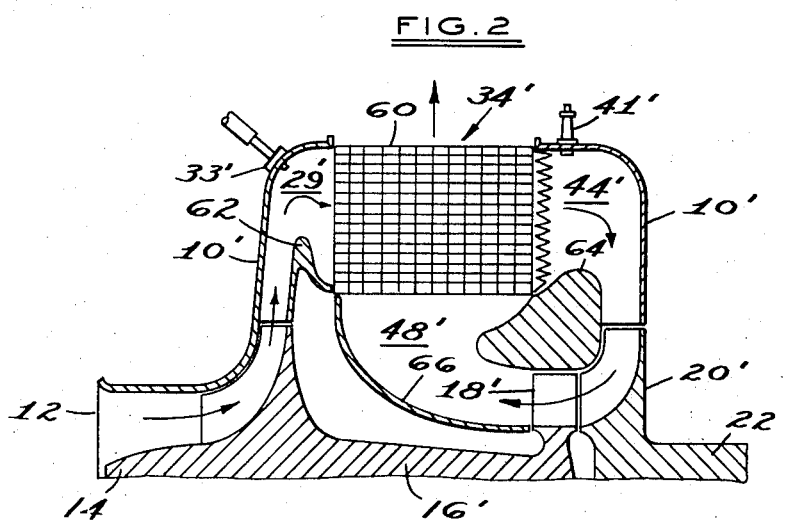
FIG. 2 is a partial sectional view of an engine in which a fuel nozzle injects fuel into the air stream shortly before the air stream enters a recuperator.

FIG. 2 shows a gas turbine engine of the invention using a stationary recuperator to perform the heat exchanging functions. Only the upper half of a gas turbine engine is shown in FIG. 2 (and FIG. 3) since the lower half is identical thereto. Referring to FIG. 2, the housing 10' extends radially outward from inlet 12, turns to parallel the rotational axis of compressor 14, and then curves downwardly toward output shaft 22. An exhaust opening 34' is cut into the parallel portion of the housing and a stationary recuperator 60 is mounted in the housing with one surface of the recuperator facing opening 34'. Recuperator 60 can be toroidal in shape.

Recuperator 60 has a plurality of passages extending parallel to the rotational axis of the compressor 14 and a plurality of passages extending at right angles thereto. U.S. Pat. 3,216,732 shows a typical recuperator construction useful in this invention. A baffle 62 ducts compressed air from compressor 14 into the forward surface of recuperator 60. Another baffle 64 combines with the rear portion of housing 10' to form a combustion chamber 44' at the rear surface of recuperator 60. Baffle 64 terminates near the outer edges of curved blades formed on output turbine wheel 20'. The blades curve forward and terminate near the blades on the compressor turbine wheel 18'. A baffle 66 begins adjacent compressor turbine wheel 18' and curves upwardly toward the bottom surface of recuperator 60.

A fuel injection nozzle 33' is mounted in housing 10' and extends into chamber 29'. An igniter 41' is located in housing 10' where it extends into chamber 44' adjacent the rear surface of recuperator 60. Only one igniter is necessary generally, although a plurality of igniters can be used to achieve easier starting and more reliable operation.

Compressed air leaving compressor 14 passes into chamber 29' where fuel is injected into the air stream from nozzle 33'. The fuel vaporizes and mixes with the air in chamber 29' as the fuel and air pass rearward through recuperator 60. Upon emerging from the rear surface of recuperator 60, the fuel and air mixture is ignited by igniters 41'. The fuel air mixture burns in chamber 44' and the hot combustion gases pass through the turbine blades on wheels 20' and 18'.

Baffle 66 guides the combustion gases leaving turbine wheel 18' into the inner surface of recuperator 60. As the gases pass through recuperator 60, heat is transferred to the fuel-air stream passing through the recuperator parallel to the rotational axis of the compressor. The combustion gases then exhaust to the atmosphere from the outer surface of the recuperator.

Figure 3:
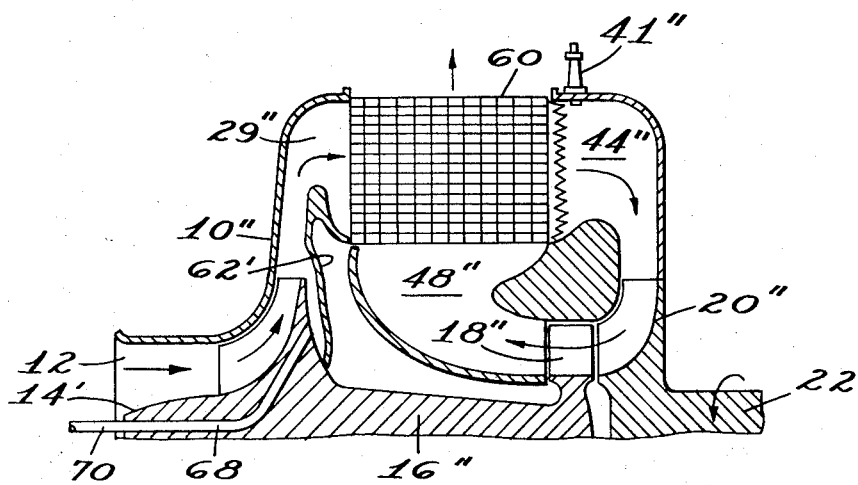
FIG. 3 is a partial sectional view of an engine in which fuel is added to the air stream from a slinger arrangement incorporated into the radial compressor.

The engine shown in FIG. 3 is essentially similar to the FIG. 2 engine except that a passage 68 is formed in compressor 14'. Passage 68 angles outward and opens at the rearward surface of the compressor. A fuel supply conduit 70 communicates with passage 68. Baffle 62' extends downward behind compressor 16' so fuel passing through passage 68 exits into chamber 29''. The fuel mixes with air leaving the compressor blades of compressor 14' and continues to mix as the fuel and air pass through chamber 29'' and through recuperator 60.

In each of the embodiments, fuel mixes with the compressed air before and during passage through the regenerator or recuperator. The much longer mixing period thus provided improves the homogeneity of the fuel-air mixtures. Ignition takes place as soon as the fuel-air mixture emerges from the regenerator or recuperator. The flame front can be anchored on the surface of the heat exchanger or can be positioned a predetermined distance from the surface by locating a screen 70 in chamber 44 as shown in FIG. 1.

Thus this invention provides a gas turbine engine that thoroughly mixes the fuel and air before combustion. Fuel is injected into the relatively cool stream of air leaving the compressor instead of into the heated air leaving the heat exchanger, and the fuel air mixture is burned as it leaves the heat exchanger. The system eliminates the need for special combustion chambers, reduces engine size and weight, and increases engine efficiency.

I claim:

1. In a gas turbine engine having a housing, a compressor means for producing a stream of compressed, relatively cool air, a turbine means using and exhausting relatively warm gases, and a heat exchanging means located so the relatively warm exhaust gases pass through at least a portion of said heat exchanging means, a system for adding heat to the stream of compressed air comprising:

fuel supply means for adding fuel to said stream of air upstream of said heat exchanging means, said heat exchanging means being a rotating disc made of ceramic materials and having an entrance surface and an exit surface for the stream of compressed air and fuel, said heat exchanging means transferring heat from the relatively warm gases leaving the turbine means to said stream of compressed air and fuel, said heat assisting in vaporizing said fuel and in mixing said fuel and air, and igniter means located proximately to the exit surface of said heat exchanging means for igniting said fuel-air mixture as the mixture leaves said heat exchanging means, the burning fuel-air mixture being anchored on the exit surface of the heat exchanging means.

2. The engine of claim 1 comprising baffle means cooperating with said exit surface of the heat exchanging means to form a combustion chamber immediately downstream of said surface, said igniting means projecting into said combustion chamber, said fuel-air mixture igniting and burning in said chamber.

3. The engine of claim 2 in which said baffle means ducts combustion gases directly to the turbine means.

4. The engine of claim 3 in which said housing and the entrance surface of the heat exchanging means form a mixing chamber and said fuel supply means comprises an injection nozzle opening into said mixing chamber.

5. The engine of claim 1 in which said housing and the entrance surface of the heat exchanging means form a mixing chamber and said fuel supply means comprises an injection nozzle opening into said mixing chamber.

6. The engine of claim 1 comprising a screen means located a predetermined distance downstream of the exit surface of the heat exchanger, said screen means assisting in holding the burning fuel-air mixture near said exit surface.

References Cited

UNITED STATES PATENTS

| | | | |
|---|---|---|---|
| 1,403,350 | 1/1922 | Short | 123—22A |
| 2,542,953 | 2/1951 | Williams | 60—39.51X |
| 2,795,109 | 6/1957 | Hryniszak | 60—39.74SX |
| 2,814,181 | 11/1957 | Schwartz | 60—39.51UX |
| 2,981,066 | 4/1961 | Johnson | 60—39.74S |
| 3,057,157 | 10/1962 | Close | 60—39.51X |
| 3,334,486 | 8/1967 | Scholz | 60—39.51X |
| 1,676,501 | 7/1928 | Moors | 431—346X |
| 2,538,179 | 1/1951 | Weinhardt | 60—39.74S |
| 3,320,044 | 5/1967 | Cole et al. | 165—4X |

FOREIGN PATENTS

| | | | |
|---|---|---|---|
| 735,186 | 8/1955 | Great Britain | 60—39.51R |

DOUGLAS HART, Primary Examiner

U.S. Cl. X.R.

60—39.74, 39.74